US006874667B2

(12) United States Patent
Dykstra et al.

(10) Patent No.: US 6,874,667 B2
(45) Date of Patent: Apr. 5, 2005

(54) VEHICLE CARGO MANAGEMENT SYSTEM

(75) Inventors: Jonathan A. Dykstra, Holland, MI (US); Darren C. McIntire, Holland, MI (US); Leif A. Norland, Holland, MI (US); Donald L. Sauer, Bemidji, MN (US); David B. Fry, Holland, MI (US); Adam W. Callif, Holland, MI (US); Chris Hogg, Holland, MI (US); Mike Burns, Holland, MI (US); John Brett, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 23 days.

(21) Appl. No.: 10/148,380

(22) PCT Filed: Nov. 29, 2000

(86) PCT No.: PCT/US00/42371

§ 371 (c)(1), (2), (4) Date: Aug. 28, 2002

(87) PCT Pub. No.: WO01/40023

PCT Pub. Date: Jun. 7, 2001

(65) Prior Publication Data

US 2003/0090120 A1 May 15, 2003

Related U.S. Application Data

(60) Provisional application No. 60/168,062, filed on Nov. 30, 1999.

(51) Int. Cl.[7] .................................................. B60R 9/00

(52) U.S. Cl. ....................... 224/498; 224/275; 224/499; 224/501; 224/506; 224/508; 224/543; 224/544; 224/925; 296/37.5; 296/37.14; 296/37.16

(58) Field of Search ................................. 224/275, 282, 224/497, 498, 499, 501, 506, 507, 508, 524, 525, 526, 539, 542, 543, 544, 925; 296/37.5, 37.8, 37.14, 37.16

(56) References Cited

U.S. PATENT DOCUMENTS

| | | | |
|---|---|---|---|
| 693,654 | A | 2/1902 | Kimball |
| 849,423 | A | 4/1907 | Ort |
| 912,781 | A | 2/1909 | Barrett et al. |
| 1,179,445 | A | 4/1916 | Manning |
| 1,280,761 | A | 10/1918 | Kirkpatrick et al. |

(Continued)

FOREIGN PATENT DOCUMENTS

| | | |
|---|---|---|
| DE | 3332695 | 3/1985 |
| DE | 4015556 | 11/1990 |
| DE | 19616963 | 6/1997 |
| DE | 19641386 | 7/1997 |
| EP | 0219632 | 8/1986 |
| EP | 0 850 804 B1 | 5/2001 |
| FR | 1578182 | 8/1969 |
| FR | 2619063 | 2/1989 |
| GB | 2 329 623 | 3/1999 |
| JP | 1-186444 | 7/1989 |

(Continued)

*Primary Examiner*—Stephen K. Cronin
(74) *Attorney, Agent, or Firm*—Foley & Lardner LLP

(57) ABSTRACT

A cargo management system of this invention includes a deep well storage area beneath a cargo floor, which well may be horizontally and/or vertically divided and which preferably includes a plurality of doors to access the well. In the illustrated embodiment, the management system also includes a panel which may be placed into three positions: a first storage position in which the panel is flush against the back of the rear seat; a second shelf position in which the panel is horizontal and spaced from the cargo floor by a first distance; and a third privacy shield position in which the panel is also horizontal but is spaced from the cargo floor a second distance, the second distance exceeding the first distance.

30 Claims, 5 Drawing Sheets

U.S. PATENT DOCUMENTS 1,329,988 A 2/1920 Montgomery
1,769,343 A 7/1930 Henry
1,781,977 A 11/1930 Cummings
1,809,866 A 6/1931 Riesche
1,834,817 A 12/1931 Woodfin
1,837,537 A 12/1931 Emerson
1,877,265 A 9/1932 Chadwick
1,887,947 A 11/1932 Savale
1,893,104 A 1/1933 Place
1,894,103 A 1/1933 Kuenzel
1,905,890 A 4/1933 Blakely
2,051,265 A 8/1936 Martin
2,069,345 A 2/1937 Widman
2,140,968 A 12/1938 Paranzino
2,160,958 A 6/1939 Critchlow
2,173,569 A 9/1939 Troendle
2,175,949 A 10/1939 Allen
2,249,845 A 7/1941 Mitchell
2,256,928 A 8/1941 Slack et al.
2,284,419 A 5/1942 Greig
2,320,614 A 6/1943 Kleine
2,337,480 A 12/1943 Logan
2,347,002 A 4/1944 Schofield
2,465,770 A 3/1949 Volsk
2,471,730 A 5/1949 Doerr
2,545,269 A 3/1951 Ford
2,619,395 A 11/1952 Kent
2,767,896 A 10/1956 Beck
2,784,027 A 3/1957 Temp
2,804,122 A 8/1957 Baum
2,867,471 A 1/1959 Coon, Jr.
2,889,097 A 6/1959 Broehl
2,956,837 A 10/1960 Koplin
3,058,771 A 10/1962 Hill et al.
3,094,354 A 6/1963 Bernier
3,110,429 A 11/1963 Phillips
3,114,574 A 12/1963 Pryale
3,132,781 A 5/1964 Poczatek
3,132,892 A 5/1964 Stevens
3,202,453 A 8/1965 Richards
3,309,135 A 3/1967 Jannetto
RE26,299 E 11/1967 Burns
3,393,936 A 7/1968 Hall
3,406,998 A 10/1968 Rutzen et al.
3,406,999 A 10/1968 Kozicki
3,446,526 A 5/1969 Peters
3,476,432 A 11/1969 Aliment et al.
3,632,029 A 1/1972 Sonner
3,795,422 A 3/1974 Robinson et al.
3,806,183 A 4/1974 Sleren et al.
D238,771 S 2/1976 Spokus, Sr.
4,190,911 A 3/1980 Wadsworth
4,198,091 A 4/1980 Appleton
4,226,348 A 10/1980 Dottor et al.
4,277,097 A 7/1981 Lalanne
4,303,367 A 12/1981 Bott
4,341,418 A 7/1982 Chappell
4,351,555 A 9/1982 Hashimoto
D266,457 S 10/1982 Johnson
4,443,034 A 4/1984 Beggs
4,455,948 A 6/1984 Torres
4,473,250 A 9/1984 Truex et al.
4,501,457 A 2/1985 Pond
D279,664 S 7/1985 Waters, Jr.
4,540,213 A 9/1985 Herlitz et al.
4,555,135 A 11/1985 Freeland
4,604,022 A 8/1986 Bourgraf
4,712,823 A 12/1987 Mills et al.
4,733,898 A 3/1988 Williams
4,750,778 A 6/1988 Hoban
4,771,507 A 9/1988 Draplin et al.
4,791,873 A 12/1988 Towfigh
4,884,733 A 12/1989 Geeves
4,889,257 A 12/1989 Steffes
4,946,120 A 8/1990 Hatcher
4,958,576 A 9/1990 Kauer
4,969,793 A 11/1990 Pawl
4,986,589 A 1/1991 McNew
5,025,964 A 6/1991 Phrippidis
5,046,433 A 9/1991 Kramer et al.
D320,372 S 10/1991 Alberts
5,094,375 A 3/1992 Wright
5,161,700 A 11/1992 Stannis et al.
5,167,433 A 12/1992 Ryan
5,195,795 A 3/1993 Cannera et al.
5,201,536 A 4/1993 Bono et al.
5,248,183 A 9/1993 Gignac et al.
5,269,229 A 12/1993 Akapatangkul
5,269,581 A 12/1993 Odagaki et al.
5,324,089 A 6/1994 Schlachter
5,370,060 A 12/1994 Wang
5,372,289 A 12/1994 Dachicourt
5,381,940 A 1/1995 Wright
5,415,457 A 5/1995 Kifer
5,427,033 A 6/1995 Bly
5,441,183 A 8/1995 Frenzel
5,443,018 A 8/1995 Cromwell
5,484,091 A 1/1996 Malinowski et al.
5,492,257 A 2/1996 Demick
5,501,384 A 3/1996 Wisniewski
5,516,016 A 5/1996 Anderson et al.
5,535,931 A 7/1996 Barlow et al.
5,538,148 A 7/1996 Indyk
5,542,745 A 8/1996 Takeda et al.
5,597,199 A 1/1997 Hoffman et al.
5,628,438 A 5/1997 Legrow
5,628,439 A 5/1997 O'Hara
5,628,543 A 5/1997 Filipovich et al.
5,669,537 A * 9/1997 Saleem et al. .............. 224/539
5,687,895 A 11/1997 Allison et al.
5,716,091 A 2/1998 Wieczorek
5,730,496 A 3/1998 Hashimoto
5,771,815 A 6/1998 Leftwich
5,799,845 A 9/1998 Matsushita
5,868,451 A 2/1999 Uno et al.
5,878,672 A 3/1999 Ostermann et al.
5,902,009 A 5/1999 Singh et al.
5,913,571 A 6/1999 Dystra et al.
5,934,727 A 8/1999 Storc et al.
6,015,071 A 1/2000 Adomeit et al.
6,026,646 A 2/2000 Hansen et al.
6,039,378 A 3/2000 Bailey
6,050,202 A * 4/2000 Thompson ................... 108/44
6,062,146 A 5/2000 Conners et al.
6,074,000 A 6/2000 Wagner
6,085,666 A 7/2000 Anderson et al.
6,092,708 A 7/2000 Rand
6,102,463 A 8/2000 Swanson et al.
6,106,044 A 8/2000 Schlachter
6,113,172 A * 9/2000 Chaloult et al. ......... 296/26.08
6,152,462 A 11/2000 Barrett
6,161,896 A 12/2000 Johnson et al.
6,247,741 B1 6/2001 Seel et al.
6,253,943 B1 * 7/2001 Spykerman et al. ........... 220/6
6,290,277 B1 * 9/2001 Spykerman et al. ....... 296/24.1
6,502,886 B1 * 1/2003 Bleau et al. ............... 296/37.3
6,644,709 B2 11/2003 Inagaki et al.

FOREIGN PATENT DOCUMENTS

JP 06-247211 9/1994
JP 09-301078 11/1997
JP 10-7030 1/1998
WO WO 99/64271 12/1999
WO WO 00/21794 4/2000

* cited by examiner

VEHICLE CARGO MANAGEMENT SYSTEM

CROSS REFERENCE TO RELATED APPLICATIONS, IF ANY

This application is a 371 of PCT/US00/42371 filed Nov. 29, 2000 which claims priority from U.S. Provisional Application Ser. No. 60/168,062, filed Nov. 30, 1999 and entitled Vehicle Seating System.

BACKGROUND OF THE INVENTION

1. Field of the Invention

The present invention relates generally to the field of vehicle cargo management systems and more particularly to a cargo management system for vans and sports utility vehicles and the like. In its most preferred embodiment, the present invention relates to a cargo management system which includes a deep well storage system having a variety of configurations and which includes a panel attached to the rear seat of the vehicle which may function as a cargo shelf or as privacy shield for the cargo area. The latter, in the preferred embodiment can include a hinged keeper flap, and netting can extend from the vehicle headliner to the rear seat to insure that objects placed on the privacy shield do not fly forward in the event of sudden braking or a front impact.

2. Description of the Prior Art

A large variety of vehicle storage systems have been described in the prior art. In recent years, the proliferation of vans and sports utility vehicles (SUVs) has created a new set of challenges for the vehicle designers, because the area behind the rear-most seat ($2^{nd}$ or $3^{rd}$ row) is the largest area for the storage of cargo, and it is typically open to view from the exterior of the vehicle. Privacy shields are known and include devices which are rolled up when the cargo space is empty or extended to cover the cargo space if luggage, camping gear, business accessories or the like are located in the storage area.

Compartments are also commonplace in vehicles and include the glove box, roof or between-the-seat consoles and compartments in the doors, seat backs or the sides of the cargo area. Such compartments can be covered by a removable or hinged door, by cargo netting or other closures. Compartments are also known which extend below the floor of a cargo area. One example is the spare-wheel storage area used in many vehicles, the spare wheel being oriented in a generally horizontal orientation and parallel to a hinged cover which forms part of the floor of the cargo area. In other SUVs, the spare wheel is located within the storage or cargo area behind the rear seat. Various storage bins can be located in the side wall trim of the cargo area, and some of such vehicles also include a door open to a chamber beneath the floor used to store tool kits, first aid kits, a jack and the like.

Space utilization is an important consideration for many people shopping for a new vehicle. An optimum cargo management system would offer a large amount of storage volume, organizational features, versatility, privacy, occupant safety, robustness, convenience and the like. Such a system would benefit the highly diverse buying public which includes travelers, sportsmen and women, campers, "soccer moms and dads," gardeners, etc. Accordingly, the development of such a system would represent a significant advance in this art.

FEATURES AND SUMMARY OF THE INVENTION

A primary feature of the present invention is to provide a vehicle cargo management system which overcomes the above-noted limitations and deficiencies of the prior art and fulfills the requirements for an optimum cargo management system.

Another feature of the present invention is to provide a cargo management system which is attached to a vehicle and which can, in a first configuration, provide an open cargo area with a floor and the capacity to hold a large object or a large quantity of items between the floor and headliner of the vehicle, between its side walls, and between the rear seat and a rear door.

A different feature of the present invention is to provide a three-position panel coupled to the rear seat which may be placed in a cargo support or a privacy screen position.

Yet another feature of the present invention is to provide a deep well storage compartment beneath the floor of the cargo management area which may be accessed through one, or preferably a plurality of doors and which may be horizontally and/or vertically divided by one or more removable, retractable or hinged trays, shelves or dividers.

Another feature of the present invention is to combine the multi-position panel with the deep well storage system to provide an additional storage surface and a privacy shield for the contents of the deep well system when one or more of its doors are opened.

An additional feature of the present invention is to provide a multi-position panel and a cargo utility screen to prevent objects placed on the panel from flying forwardly toward seat occupants in the event of sudden braking or a frontal impact.

How the foregoing and further objects of the invention are accomplished, individually and in various combinations, will be described in the following detailed description of the preferred embodiment taken in conjunction with the drawings. Generally, however they are accomplished in a cargo management system which includes a well located below the cargo floor which may be accessed through one or more doors, three doors being preferred. The well may be subdivided into a variety of different sized compartments or may be entirely open to accept larger articles. In the preferred and illustrated embodiment, two removable trays are used to subdivide the well horizontally and the well is vertically divided also. The well doors are preferably retractable and may be removable, so that they may be used as dividers or as functional components in the cargo management system. With the well open or closed in any of its various configurations, a panel is provided and coupled to the rear seat. It is attached with a link mechanism that allows the panel to serve as a cargo storage shelf (in which the panel is located parallel to the cargo floor and spaced apart at a first distance therefrom) or to be rotated using a link assembly so that it becomes a privacy shield, wherein it is also parallel to the cargo floor but spaced a second greater distance therefrom.

The features of the invention are also accomplished by employing a keeper flap on an edge of the aforementioned panel to prevent items placed thereon from falling rearwardly from the panel, the keeper flap being hinged for storage when the panel is not being used or is being used as a privacy shield. Furthermore, netting or other types of screens can be provided to prevent items held by the cargo system from flying forward in the event of sudden braking or a frontal impact.

Other ways in which the features of the invention are accomplished will become apparent to those skilled in the art after they have read this specification. Such other ways are deemed to fall within the scope of the invention if they fall within the scope of the claims which follow.

DESCRIPTION OF THE FIGURES

In the various FIGURES, like reference numerals are used to indicate like components.

DETAILED DESCRIPTION OF THE PREFERRED EMBODIMENT

Before proceeding to the detailed description of the preferred embodiment of the invention, several general comments will be helpful in understanding the applicability and the scope of the present invention.

First, two retractable doors and one hinged door are shown for covering the well. These doors can perform organizational functions which will be described later. The number, shape and/or size of doors can be enlarged or reduced. Moreover, one or more of the doors could be locked to deter theft of valuables stored in the well. Typically, the exterior surface of the doors will be carpeted using materials compatible with the surrounding vehicle trim.

Second, removable trays are preferred and are illustrated, but they can be eliminated entirely or be an accessory if the owner wants a greater variety of storage options. The illustrated trays show hand holes to facilitate removal, but the trays could be hinged to provide access to the compartment(s) located therebeneath. In one embodiment, the trays are removed from the vehicle during storage and are replaced to provide another shelf surface.

Third, the materials selected for the wells, trays and doors can be selected from those previously used in the trade and should exhibit durability, cleanability, and a pleasing aesthetic appearance. Various combinations of steel, plastics, fibers, carpeting, wood products and the like can be employed for these components.

Figure 3:
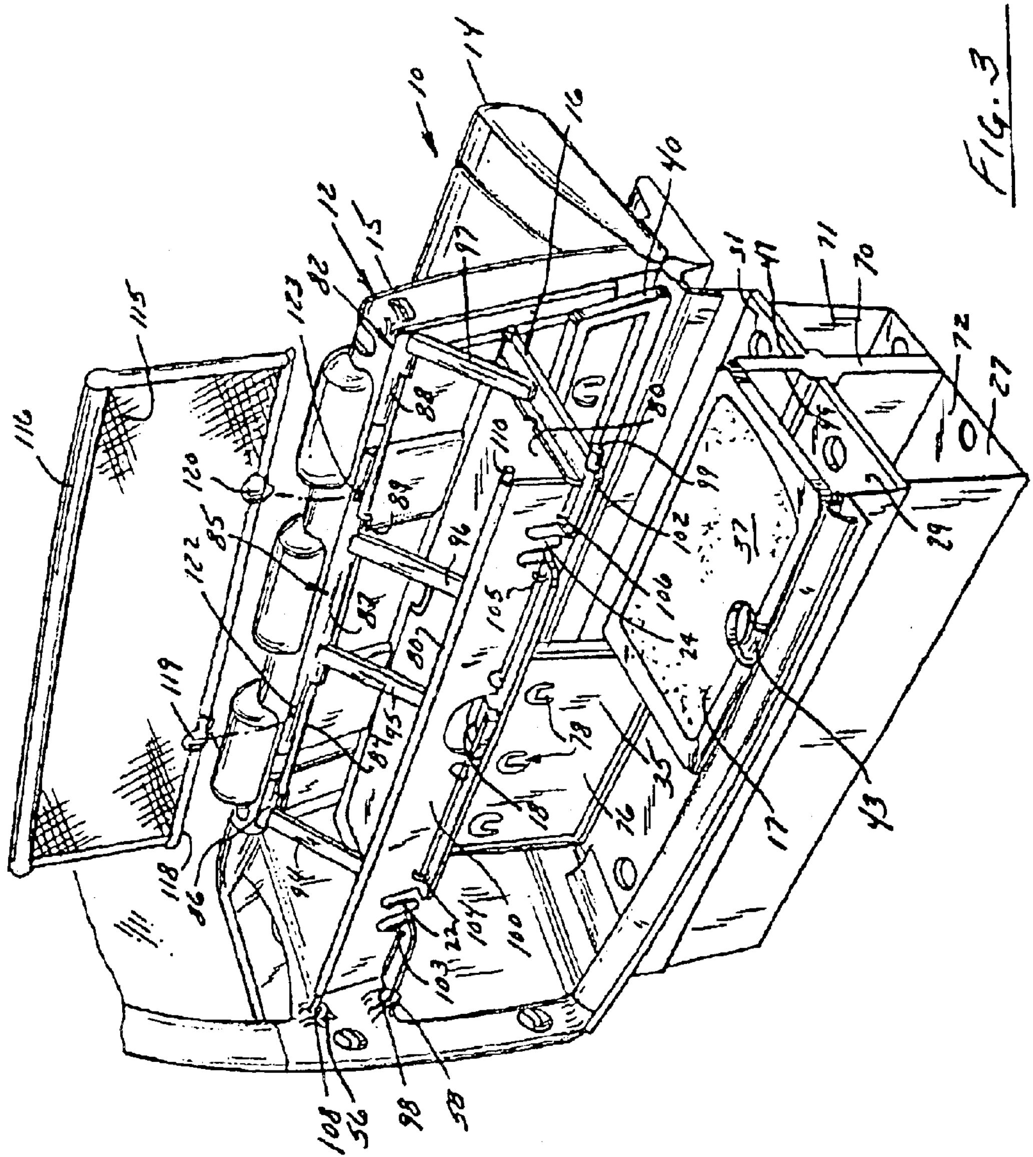
FIG. 3 is a view of the cargo management system of FIGS. 1 and 2, components of which have been rearranged to open the well storage area and in which the seat panel and its associated keeper flap has been placed in a cargo holding first position, this view also showing netting suspended from the headliner area of the vehicle and in a position where it can be coupled to the back of the top portion of panel support mechanism.
Figure 4:
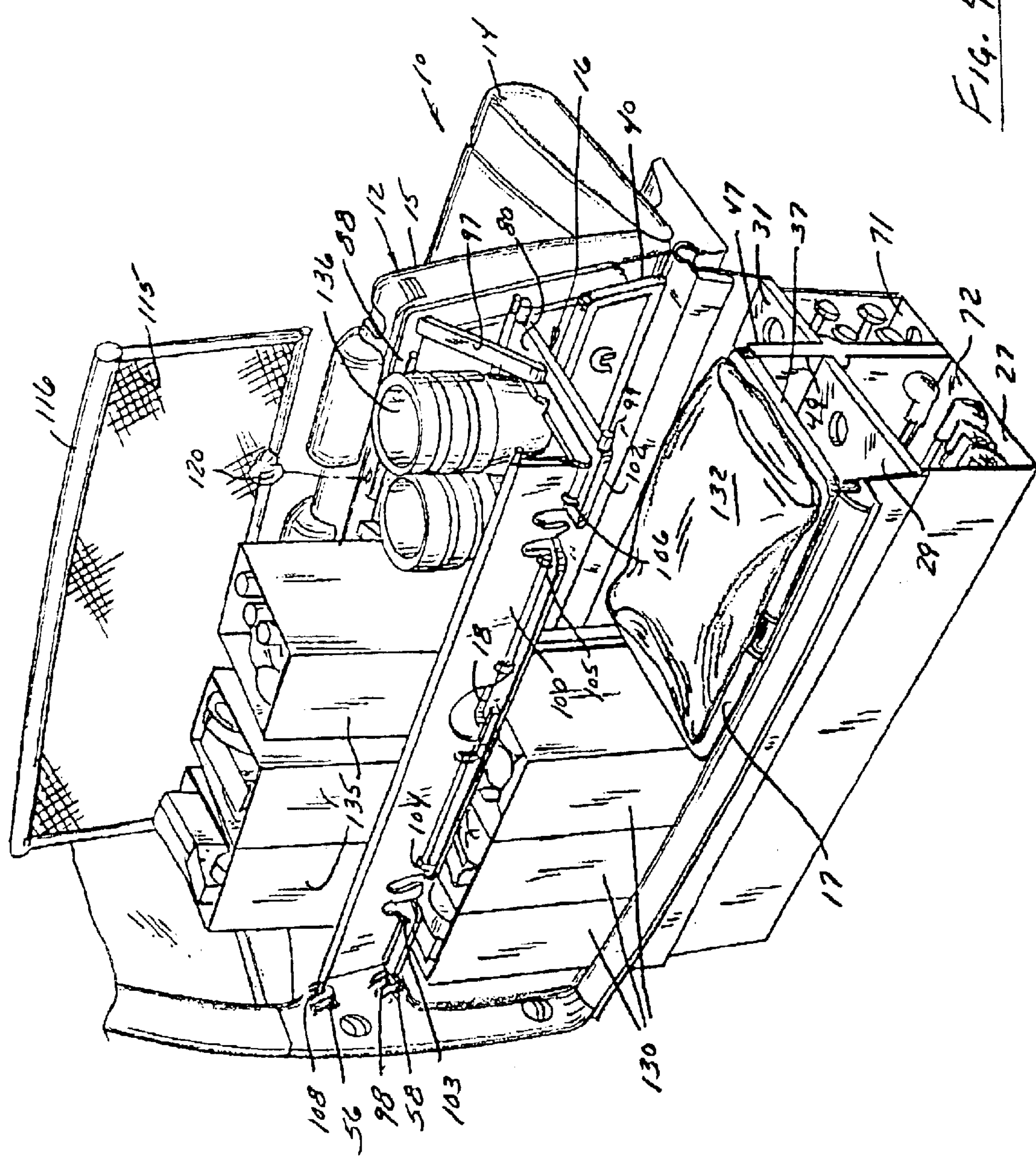
FIG. 4 is a view similar to FIG. 3 and illustrating a wide variety of types of cargo.
Figure 5:
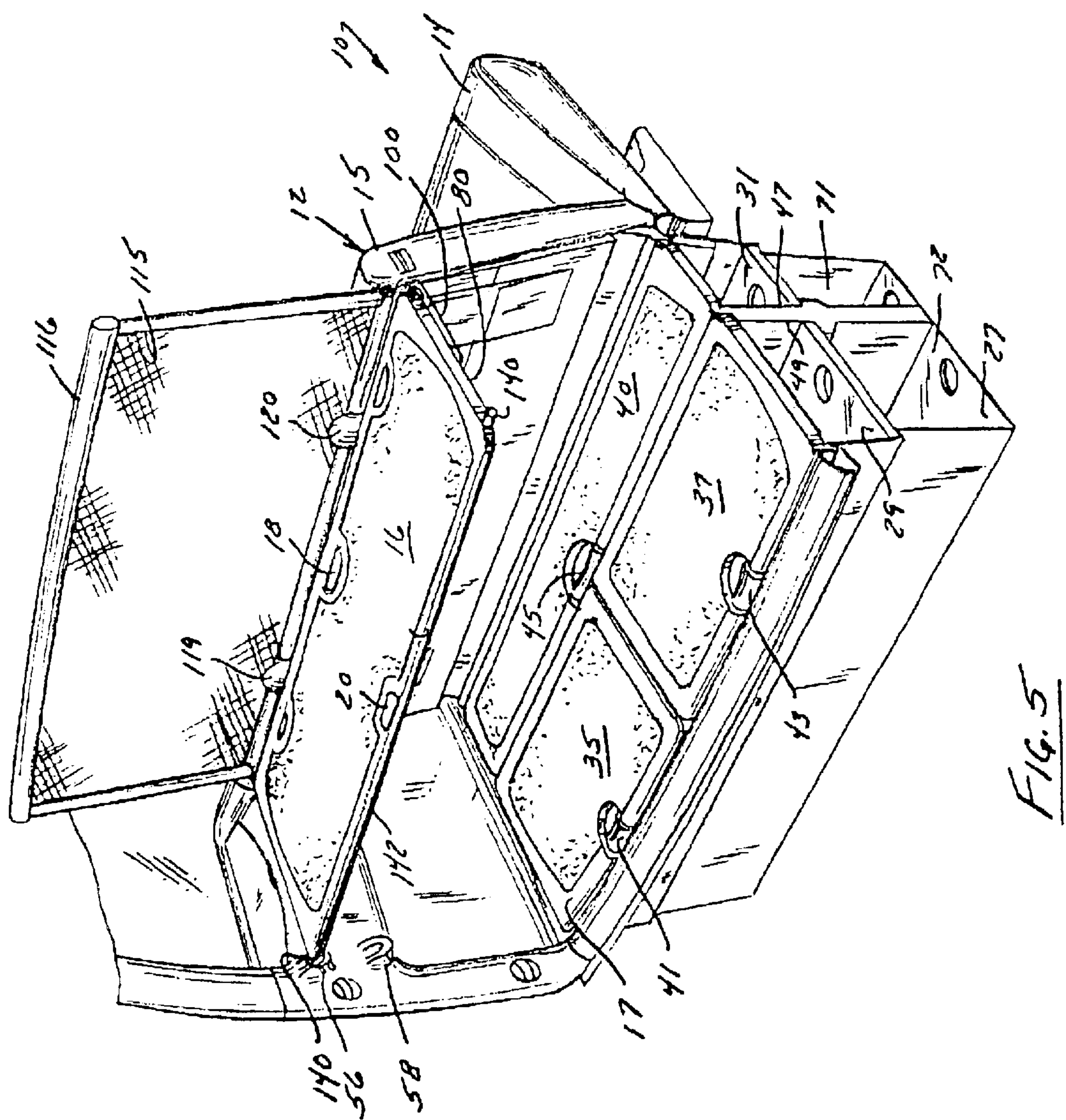
FIG. 5 is a perspective view illustrating use of the cargo floor and both levels of the well, with the panel in its privacy screen position.

Fourth, dealing next with the well, the FIGURES illustrate an open bottom and two elongate storage areas defined by the bottom of the doors and the upper surface of the removable trays. In FIGS. 3, 4 and 5, however, an optional divider is provided to create two elongate storage areas in the deepest part of the well and two elongate compartments between the doors and the trays. Certain items have been selected for storage in these areas, the selection and the compartments being suitable for such articles, but those illustrations should in no way be considered as limiting. The lowest part of the well could be subdivided by longitudinal and lateral vertical dividers to provide as much organization as the vehicle operator desires. The dividers can be entirely removable, hinged or fastened to the well using snap fasteners, tracks, Velcro.RTM., etc. The lower compartments, in addition to or in lieu of the doors, could be locked for security and/or safety reasons. An egress interior latch can also be included to prevent a child from being accidentally entrapped in the well.

Fifth, the multi-position panel is illustrated as being full width (i.e., extending across nearly the entire back surface of the rear seat), but the panel could be segmented if desired for 60/40 and other types of split seats. The number of links and body supports would be varied in such situations. Moreover, while the preferred support system, whether in the shelf or privacy screen mode, is illustrated as cylindrical extensions received in receptacles in the side wall trim, other supports, for example legs extending downwardly or supports extending downwardly from the headliner area (e.g., rigid supports, ropes and the like) could be used for supporting the outer rear corners of the panel.

Sixth, two accessories are shown for use with the panel portion of the cargo management system of the present invention. One is a keeper flap which extends generally perpendicularly from the rear edge of the panel when it is deployed as a shelf, and which folds away during panel storage and when the panel is in its privacy screen orientation. The height of the keeper, the materials from which it may be constructed (flexible or rigid plastics, fabric, etc.) and the way it is supported may be widely varied. The other accessory is the netting which extends downwardly from the headliner area, is attached to the panel support and which prevents objects from flying forwardly in the event of sudden braking or a frontal impact. For instance, rigid screens may be used, the screen or netting may be stored in the rear seat and be pulled upwardly to attach it to the headliner, etc.

Seventh, it is not required that the panel and deep well storage systems be used with one another, although to do so will result in optimized cargo space utilization, and either sub-system could be used with other cargo management systems and enhance the value thereof.

Eighth, several other enhancements are illustrated in the FIGURES which may be omitted or modified in placement, number and construction without departing from the invention's intended scope. Examples include the drain plugs located in the deep well system and the plastic grocery bag hooks located on the underside of the well doors and which are in a useful position when the doors are vertically oriented.

Figure 1:
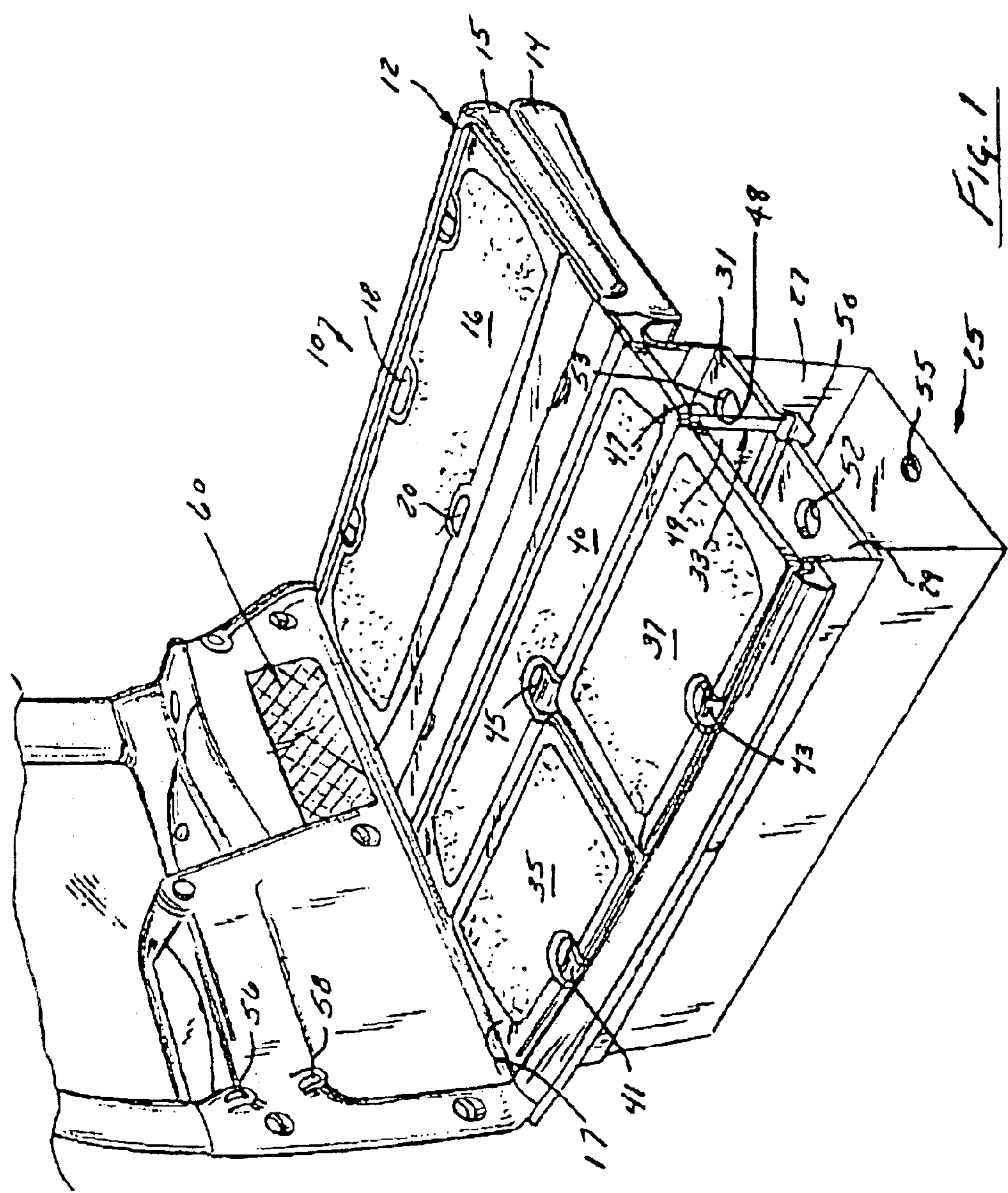
FIG. 1 is a perspective view of the cargo management storage system of the present invention with the back seat lowered to form a large capacity cargo space.

Proceeding now to the description of the preferred embodiment, the cargo management system 10 is shown in a first position in FIG. 1. A seat 12 having a cushion 14, and a seat back 15 is shown in a folded down position so that the seat back 15 and a panel 16 located therein are generally coplanar with the floor 17 of the cargo area behind the seat 12. Panel 16 includes a pair of handles 18 and 20, use of which will be descried later, as well as a pair of bag hooks 22, 24 integrated with the keeper flap to be described later and with panel 16.

FIG. 1 also shows certain components of the deep well storage system 25, including a bottom chamber 27, a pair of trays 29, 31, a divider wall 33 and three doors 35, 37 and 40. In this embodiment, doors 35 and 37 include handles and latches 41 and 43 for lifting the door rear edges upwardly and to retract the doors 35 and 37. Door 40, on the other hand, includes a handle and latch 45 for opening and rotating the door to an open position (see FIG. 3).

Closer examination of FIG. 1 also shows that divider wall 33 includes a channel 48 formed from a forward wall 47 and a rearward wall 49 (made, for example, from steel, plastic or the like), such walls being spaced from each other by a distance slightly wider than the thickness of doors 35 and 37. The channel 48 receives the retractable doors 35 and 37.

Openings 52, 53 are shown in trays 29 and 31, respectively, and are sized to allow the vehicle operator to lift upwardly on trays 29 and 31 to remove them (a hinged tray could also be used) if a deep storage area is needed, or if it is desired to place objects in the bottom portion of well 27. A duplicate set of openings 52 and 53 is located at the opposite ends of trays 29 and 31. Also shown in FIG. 1 is a drain plug 55 which can be removed if, for example, plants or other wet or damp objects are placed into well 27, or if well 27 is being cleaned. The drain plugs can be any elastomer, such as a urethane elastomer, or a screw or other mechanical plug. The finish of the interior of well 27 is preferably carpeted or a plastic liner or painted metal, a rubberized finish or other vehicle finishes can be used. Likewise, panel 16 and doors 35, 37 and 40 can be made from a single material (e.g., plastic resin), or an outer surface can be used with an interior area covered with cloth, carpet material and the like, with any necessary internal metal or plastic supports.

FIG. 1 also shows another important feature of the illustrated and preferred embodiment, i.e., a pair of receptacles 56, 58, the purpose of which will become apparent as the description continues. In addition, cargo net covered storage compartment 60 are formed in the side wall of the cargo area. These do not, in and of themselves, form part of the present invention.

Figure 2:
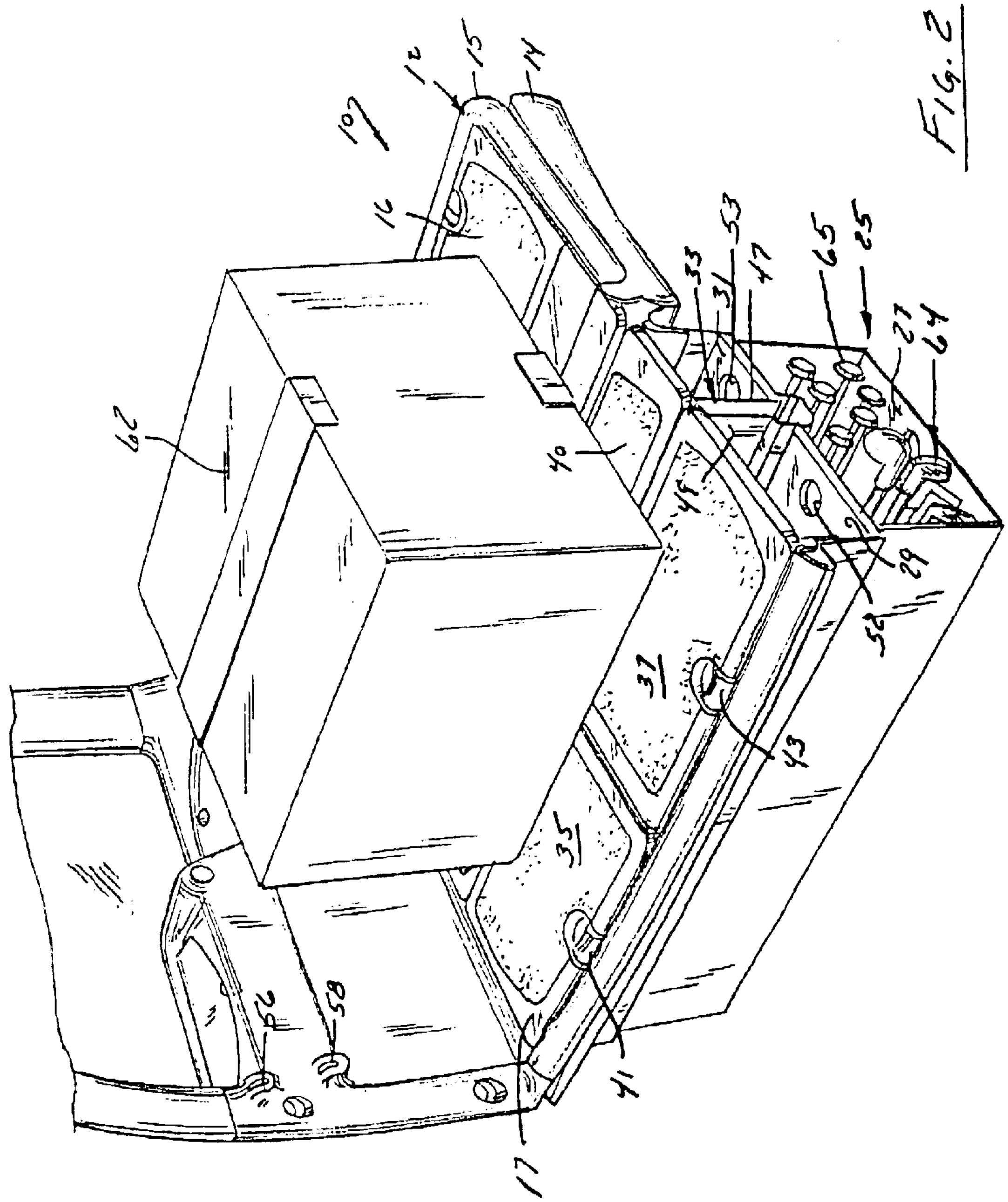
FIG. 2 is a view similar to that of FIG. 1 with a large crate located in the cargo space.

FIG. 2 illustrates two additional items. First, a large corrugated container 62 is located on the cargo floor 17 to illustrate that while in the configuration depicted in FIG. 1, the cargo management system of the present invention provides an area for loading large objects of this type. Golf clubs 64 and the legs 65 of a folded playpen (these are illustrative objects only) are also shown in the bottom of well 27.

FIG. 3 begins to show the variety of different configurations which are possible for cargo management system 10. Initially, it should be noted that an optional fixed or removable divider wall 70 is located in well 27 to divide it into a forward compartment 71 and a rearward compartment 72. Also, door 35 has been opened and retracted into the channel 48. When this has been done, the underside 76 of door 35 may perform several functions, such as dividing the cargo area at a level above floor 17 or, as illustrated, a plurality of plastic handle grocery bag hooks 78 can be accessed. The same benefits can be accomplished by moving door 37 in the same manner.

The panel 16, and its loading shelf position, can now be explained by reference to FIG. 3. Latch 18, it will be noted, is now located on the rear edge of a horizontal shelf formed by the interior surface 80 of panel 16. Moreover, the mounting of panel 16 can be understood in connection with a link assembly 82. A metal rod 84 (the rod could be segmented) extends parallel to the upper edge of seat back 15 and is held in place by housings attached to the seat back, i.e., illustrated items 86, 87, and 88, each including an extension (e.g., 89) through which rod 84 passes.

Four links 94, 95, 96 and 97 are rotatably coupled to rod 84 and to pins (not shown) on the rear surface 80 of panel 16. Panel 16 is also supported by spring loaded cylindrical extensions 98, 99 (preferably coupled to the panel latches) which are received in the lower receptacles 58 in the side trim of the cargo area.

FIG. 3 also shows the keeper flap 100 which extends upwardly from the rear edge 102 of panel 16. It is rotatably coupled to a series of four rods 103–106 attached to panel 16 (or a snap fit or other rotatable coupling system can be used). Cylindrical extensions 108, 110 extend outwardly from the top ends of keeper flap 100 and are received in the upper receptacles 56 located in the side trim of the cargo area.

FIG. 3 furthermore shows netting 115 having an upper end 116 suitably attached to the vehicle roof or headliner (not shown) and a lower end 118. Also, a pair of catches 119–120 are formed on the lower edge and are arranged to engage recesses 122, 123 in housing 87. When so engaged, the netting 115 will separate any item placed on panel 16 from the passenger compartment of the vehicle interior.

FIG. 4 shows cargo management system 10 in the same configuration as shown in FIG. 3, with bags 130 disposed on tray 29, a large sack 132 disposed on door 37 and additional sacks 135 and gardening pots 136 located on panel 16 in its shelf position.

The versatility of the cargo management system 10 according to the present invention is further illustrated in FIG. 5. Here it will be noted that panel 16 has been flipped over from its position shown in FIGS. 3 and 4, and spring loaded cylindrical extensions 140 located on the lower edge 142 of panel 16 are disposed in upper receptacles 56 in the side trim of the cargo area.

Movement of panel 16 to this position occurs either from the stored position of FIGS. 1 and 2 (with the seat back 15 raised) if the lower edge 142 is unlatched and lifted up so the extensions 140 are pulled inwardly so that they can be placed in receptacles 56. Alternatively, if the panel 16 was in its shelf position (FIGS. 3 and 4), the spring loaded extensions 98 and 108 of the panel 16 are pulled inwardly and the keeper flap 100 is manually raised by unlatching pushing edge 102 upwardly. The opposite edge 142 will drop downwardly, and the links 94–97 will fold against the seat back 15. The keeper flap 100 is stowed against surface 80 of panel 16, as rotation of panel 16 continues to the point that the extensions 140 will reach a position where they can be into receptacles 56.

In the FIG. 5 arrangement, a large cargo management area is located beneath panel 16 and, the area can be subdivided, e.g., by placing doors 35 and 37 in their receiving slots, by leaving in or removing trays 29 and 31, and by opening door 40. Door 40 in this, as well as in the FIG. 3 arrangement, can be held open by hooks, springs, Velcro® or the like.

So while the present invention has been shown and described by reference to a single illustrated embodiment and by reference to a number of changes which can be made thereto, the present invention is not to be limited thereby but is to be limited solely by the scope of the claims which follow.

What is claimed is:

1. A cargo management system for a vehicle having a rear seat and a generally horizontal, planar cargo floor behind the rear seat comprising: at least one door covering an opening in the cargo floor providing access to a storage area located therebeneath and a panel on the back of the rear seat, the panel having a first stored position, a second cargo shelf position horizontal to the cargo floor and spaced therefrom by a first distance, and a third position horizontal to the cargo floor and spaced a second distance from the cargo floor, the second distance exceeding the first distance.

2. The cargo management system of claim 1 wherein the vehicle includes two side walls adjacent the cargo floor, receptacles being provided in each side wall, extensions extending from the panel and being placed in the receptacles when the panel is in its second and third positions.

3. The cargo management system of claim 1 wherein the panel has an inner surface and outer surface when it is in its first position and a plurality of links are rotatably coupled to the seat back and to the inner surface of the panel whereby the panel may be rotated about the inner surface coupling to move the panel between its positions.

4. The cargo management system of claim 1 wherein at least one door is retractable into the vehicle.

5. The cargo management system of claim 4 wherein each retractable door is adapted to be placed in a vertical orientation.

6. The cargo management system of claim 1 wherein said panel includes an upper edge and a lower edge when it is in its first position and wherein the upper edge becomes the rear edge when the panel is in its second position.

7. The cargo management system of claim 6 wherein the lower edge is the rear edge when the panel is in its third position.

8. The cargo management system of claim 6 wherein a keeper flap extends from the rear edge of the panel when it is in its second position and is stored when the panel is in its first and third positions.

9. The cargo management system of claim 6 wherein cylindrical extensions extend from the sides of each of the upper and lower edges of the panel and the vehicle includes two side walls adjacent the cargo floor, receptacles being provided in each side wall arranged to receive the extensions when the panel is in its second and third positions.

10. The cargo management system of claim 1 wherein a storage well is located beneath the cargo floor and is accessed by a door.

11. The cargo management system of claim 10 wherein the storage well is accessed by a plurality of doors in the cargo floor.

12. The cargo management system of claim 10 wherein three doors are provided for the storage well, two of the doors being retractable and one door being hinged.

13. The cargo management system of claim 10 wherein the well includes a drain plug and an opening in its bottom adapted to receive the drain plug.

14. The cargo management system of claim 10 wherein the storage well is divided horizontally into at least two storage areas.

15. The cargo management system of claim 14 wherein the horizontal divider is at least one removable tray.

16. The cargo management system of claim 10 wherein the storage well is divided into a plurality of storage areas by vertical walls.

17. The cargo management system of claim 16 wherein at least one door is retractable into the vehicle.

18. The cargo management system of claim 17 wherein each retractable door is adapted to be placed in a vertical orientation, and wherein a channel receives the door.

19. A cargo management system for a vehicle having a rear seat and a cargo floor behind the rear seat, the management system including: a panel on the back of the rear seat, the panel having a first storage position, a second cargo shelf position horizontal to the cargo floor and spaced therefrom by a first distance, and a third position horizontal to the cargo floor and spaced a second distance from the cargo floor, the second distance exceeding the first distance.

20. The cargo management system of claim 19 wherein the vehicle includes two side walls adjacent the cargo floor, receptacles being provided in each side wall, extensions extending from the panel and being placed in the receptacles when the panel is in its second and third positions.

21. The cargo management system of claim 19 wherein the panel has an inner surface and outer surface when it is in its first position and a plurality of links are rotatably coupled to the seat back and to the inner surface of the panel whereby the panel may be rotated about the inner surface coupling to move the panel between its positions.

22. The cargo management system of claim 19 wherein said panel includes an upper edge and a lower edge when it is in its first position and wherein the upper edge becomes the rear edge when the panel is in its second position.

23. The cargo management system of claim 22 wherein the lower edge is the rear edge when the panel is in its third position.

24. The cargo management system of claim 22 wherein a keeper flap extends from the rear edge of the panel when the panel is in its second position and is stored when the panel is in its first and third positions.

25. The cargo management system of claim 22 wherein cylindrical extensions extend from the sides of each of the upper and lower edges of the panel and the vehicle includes two side walls adjacent the cargo floor, receptacles being provided in each side wall arranged to receive the extensions when the panel is in its second and third positions.

26. A cargo management system for a vehicle including a rear seat and a cargo floor located behind the rear seat, a storage well located beneath the cargo floor and at least one door to access the storage well, and wherein the well is horizontally divided into upper and lower storage areas, and wherein the lower storage area is vertically divided into a first lower storage area and a second lower storage area.

27. The cargo management system of claim 26 wherein at least one tray divides the well into upper and lower storage areas.

28. The cargo management system of claim 26 wherein the well is divided by at least one vertical wall to create forward and rearward well storage areas.

29. The cargo management system of claim 28 wherein at least one separate door is provided for each of the forward and rearward storage areas.

30. The cargo management system of claim 29 wherein each door for the rearward storage area is retractable and each door for the forward storage area is hinged.

* * * * *